United States Patent [19]

Redford et al.

[11] 4,271,905
[45] Jun. 9, 1981

[54] GASEOUS AND SOLVENT ADDITIVES FOR STEAM INJECTION FOR THERMAL RECOVERY OF BITUMEN FROM TAR SANDS

[75] Inventors: David A. Redford, Fort Saskatchewan; Mohsen R. Hanna, Calgary both of Canada

[73] Assignee: Alberta Oil Sands Technology and Research Authority, Edmonton, Canada

[21] Appl. No.: 13,551

[22] Filed: Feb. 21, 1979

[51] Int. Cl.³ .............................................. E21B 43/24
[52] U.S. Cl. .................................... 166/263; 166/272; 166/303
[58] Field of Search ................. 166/272, 261, 303, 263

[56] References Cited

U.S. PATENT DOCUMENTS

| | | | |
|---|---|---|---|
| 3,360,044 | 12/1967 | Lange | 166/272 |
| 3,768,559 | 10/1973 | Allen et al. | 166/272 |
| 3,881,550 | 5/1975 | Barry | 166/272 |
| 3,908,762 | 9/1975 | Redford | 166/272 X |
| 3,978,925 | 9/1976 | Redford | 166/272 X |
| 4,004,636 | 1/1977 | Brown et al. | 166/272 |
| 4,026,358 | 5/1977 | Allen | 166/272 X |
| 4,048,078 | 9/1977 | Allen | 166/272 X |
| 4,109,720 | 8/1978 | Allen et al. | 166/272 X |
| 4,114,690 | 9/1978 | Cram et al. | 166/272 X |
| 4,119,149 | 10/1978 | Wu et al. | 166/272 X |

Primary Examiner—Stephen J. Novosad
Attorney, Agent, or Firm—Max L. Wymore

[57] ABSTRACT

A process is provided for the recovery of hydrocarbons from a reservoir of heavy oil containing sands. An injection stream comprising steam, hydrocarbon diluent, and a gas which is gaseous at formation temperature and pressure and soluable in the formation fluids at injection pressure is injected into the reservoir to mobilize the heavy oil, producing a flow of formation fluids which is subsequently produced from the reservoir. Suitable gases include carbon dioxide and oxygen. Naphtha is a preferred diluent. The provision of both diluent and gaseous additives in the steam injection stream is shown to improve conformance within the reservoir to enhance ultimate recovery of hydrocarbons from the reservoir.

14 Claims, 10 Drawing Figures

$PR_l$ VERSUS $PR_d$ (LAST 8 HR.)

18051 (Naphtha + 0.5 SCF $CO_2$/lb. steam)
18053 (Naphtha + 0.2 SCF $CO_2$/lb. steam)
18055 (Naphtha + 0.1 SCF $CO_2$/lb. steam)
18058 (Naphtha + 0.02 SCF $CO_2$/lb. steam)
18059 (Naphtha + 0.1 SCF $CO_2$/lb. steam)

$PR_l$ VERSUS $PR_d$ 18051 (Naphtha + 0.5 SCF $CO_2$/lb. steam)
18055 (Naphtha + 0.1 SCF $CO_2$/lb. steam)
18059 (Naphtha + 0.1 SCF $CO_2$/lb. steam)
18062 (Naphtha + 0.1 SCF $O_2$/lb. steam)

GASEOUS AND SOLVENT ADDITIVES FOR STEAM INJECTION FOR THERMAL RECOVERY OF BITUMEN FROM TAR SANDS

BACKGROUND OF THE INVENTION

The process of the present invention relates to the recovery of hydrocarbons from a subterranean formation of heavy oil containing sand and in particular to the recovery of hydrocarbons by simultaneously injecting steam, gas and hydrocarbon diluent along an established communication zone in the formation and producing a formation fluid therefrom.

Heavy oil containing sands are sands saturated with crude petroleum or bitumen of high viscosity which cannot be recovered by conventional petroleum recovery methods. Under reservoir conditions, the bitumen or heavy oil in the sands cannot be made to flow with any practical pressure gradient. An in situ process for the recovery of bitumen has a goal to reduce the viscosity of the bitumen thereby making it more amenable to flow. At reservoir temperature bitumen has a viscosity of several million centipoise, however, in raising the temperature to 300° F., the viscosity is reduced to about 35 centipoise and at 400° F. is reduced to 5 to 10 centipoise.

It has been long recognized to utilize steam as an agent to achieve a hot drive for the recovery of hydrocarbons from formations of heavy oil containing sand. Usually a communication zone, that is a permeable pathway, is established between at least two wells penetrating the heavy oil containing sand formation. Communication zones may exist as naturally occurring permeable strata or may be established by conventional methods of hydraulic fracturing and propping. The steam is injected through one well at high temperature and pressure, passes through the communications zone, transferring sufficient heat to the heavy oil containing sands to lower the viscosity of the bitumen or heavy oil, and drives a steam-steam condensate-heavy oil mixture to be produced at the second well.

More recently, additives have been used to improve recovery from heavy oil containing sand. These additives usually work in one of two ways. Increased drive energy can be provided in the reservoir by using additives which dissolve in the formation fluids at the pressures and temperatures of injection, but flash from the fluids as the pressure is reduced to provide a solution-gas drive. Additives such as low molecular weight hydrocarbons, carbon dioxide, nitrogen and oxygen have been suggested for use in the past.

Additives are also used to provide a solvent effect. In this case, the additive dissolves in the bitumen to reduce the viscosity and improve fluid transmissibility within the formation. Suitable solvents include $C_6$ linear or aromatic compounds, multiple ring aromatics, naphtha, and volatile solvents such as carbon disulphide and toluene.

A number of prior art patents disclose these additives being combined with the steam recovery of bituminous sand.

Redford, in U.S. Pat. No. 3,908,762, discloses the use of steam together with a non-condensible gas such as carbon dioxide, air or nitrogen in a recovery process in order to expand an established communication zone.

Barry, in U.S. Pat. No. 3,881,550, suggests injecting steam with a hot solvent such as depentanized naphtha into the formation and recovering a fluid-bitumen mixture from a remotely located well. However, steam-solvent recovery systems have, in the past, required large quantities of relatively expensive solvents to be injected into the formation. Usually volumes in the order of 10–40% per pound of steam have been used.

Multi-additive systems have been proposed for use with steam recovery wherein solvent and gas are added together to pre-condition the reservoir in a soak shut-in period before injecting steam to effect recovery. U.S. Pat. Nos. 4,004,636, to Brown et al and 4,026,358, to Allen disclose such systems.

To our knowledge it is not a known process to utilize the advantages of steam, gas and solvent in an additive manner by injecting the three components simultaneously into a bituminous formation.

SUMMARY OF THE INVENTION

The present invention provides a process for the recovery of hydrocarbons from heavy oil containing sand formations by injecting simultaneously an injection stream of steam, gas and hydrocarbon diluent into the formation and producing therefrom a flow of formation fluids.

The present invention is based on the discovery that when gas and solvent additives were added to the steam injection stream the benefits to recovery arising from the added drive energy and the solvent effect were not strictly additive in nature, that is the two displacement mechanisms did not function independent of each other at all conditions. In fact, there was a balance between the amounts of gas and solvent included in the steam injection stream which would continue to improve recovery. More particularly, what was observed was that as the concentration of the gas in the steam-solvent injection stream was initially increased, the recovery exhibited the beneficial effects of both the gas and solvent additives. However beyond a critical concentration range of the gas additive, the recovery began to show only the benefits of the gas drive effect.

While not being bound by same, the theory and mechanism of this process appears to be as follows.

The steam is the main agent which is reducing the viscosity of the bitumen heavy oil and thereby increasing the mobility of the bitumen. Under the high pressures of injection, the steam also provides the majority of the drive energy to the bitumen. The hydrocarbon diluent, being chosen to dissolve in the bitumen at reservoir temperatures without vaporizing, appears to assist in the transfer of heat from the steam to the bitumen and is able to increase the extent of steam penetration into the formation. In this way a more complete removal of the bitumen from the formation can be achieved. The solvent also seems to lower the resistance to flow within the formation. The gas is chosen such that at the pressures of injection, the gas goes into solution while at the lower pressures of a production drawdown cycle the gas comes out of solution to provide energy drive to the recovery of fluids. At concentrations of the gas wherein there is added gas in excess of the amount which will dissolve at injection conditions, the gas begins to collect as a blanket at the interface of heated and cold bitumen to hinder heat transfer from the steam to the bitumen. Another mechanism which may be in play is that as gas saturation within the formation increases, permeability of the formation to liquids decreases. This gives rise to an increase in gas production with an overall decrease in fluid production.

The process of the present invention is most preferably practiced to receive benefits to recovery from each of the three components steam, gas and solvent-injected. This can be achieved by limiting the concentration of gas in the steam-solvent injection stream to that which will substantially dissolve in the formation fluids without forming any substantial gas-phase in the formation. The gas preferably used is selected from a group comprising carbon dioxide and oxygen. Ethane has also been shown to be useful. A preferred concentration range of about 0.02 to 0.2 SCF gas/lb. steam injected is used.

The solvent used in the present invention is preferably naphtha which can be included in the injection stream in concentrations less than about 5 volume % of steam injected.

In accordance with the present invention there is provided in a process for the recovery of hydrocarbons from a subterranean formation of heavy oil containing sands penetrated by an injection well and a production well which are interconnected by a permeable hot communication zone through the formation, the improvement comprising introducing into the formation through the injection well and hot communication zone, an injection stream at temperature and pressure greater than the formation temperature and pressure such that the injection stream combines with and mobilizes the bitumen to produce a flow of formation fluids, said injection stream comprising steam, hydrocarbon diluent and a gas which is gaseous at formation temperature and pressure and soluable in the formation fluids at injection pressure; terminating pressurized injection; and then producing formation fluids "by pressure drawdown" from the production well.

It may be desirable to close in both production and injection wells for a soak period following injection to allow the heat to permeate the formation and reservoir fluids to drain into the communication zone, prior to opening the production well to produce mobile fluids.

While the process is preferably applied in a situation wherein at least two wells penetrate the formation, the process can also be applied to a single well having a permeable hot zone extending into the formation. The steam-gas-solvent stream is injected into the formation. Injection is then terminated and the formation fluids are produced from the well.

Injection and production drain cycles are preferably repeated at least once.

DESCRIPTION OF THE PREFERRED EMBODIMENT

Experimental

To illustrate the operability and optimum operating conditions of the process of the present invention a laboratory cell was constructed and a number of experiments were performed in which the conditions of a subterranean bituminous sand formation were simulated.

A bed of bituminous sand was enclosed in a circular 14" diameter stainless steel liner spaced about 2" from the cell walls of a circular steel laboratory cell. Additional bituminous sand was packed between the walls and the liner for insulative purposes. The sands were packed to a density approximately the density encountered in actual formations. The bed was enclosed above and below by clay seals formed from a mixture of powdered dry clay and 10% water. Sealing and insulation of the bed was necessary to lower the amount of heat conducted away from the bed.

Injection and production wells, comprising 1" diameter steel pipes fitted with sand excluders and spaced 3" from the cell walls, penetrated the bed. The sand excluders provide fluid communication with the formation while excluding the entry of sand into the wells. A slotted steel container filled with porous gravel was used for this purpose. Injection and production valves respectively were inserted into injection and production lines leading from the wells.

In packing the bituminous sand into the cell, a communication zone was established between the two wells in substantially horizontal alignment with the sand excluders of each well. To accomplish this, 20–40 mesh clean sand was packed in a $\frac{1}{2}"\times 2"\times 12"$ path to interconnect the two wells. This communications zone was used to simulate a sand propped fracture path or a naturally occurring permeable stratum interconnecting the two wells.

A piston was lowered onto the sealed bed of bituminous sands to establish an overburden pressure of 1000 psi.

Once the cell had been thus prepared, hot communication between the two wells was established in the following manner. Saturated steam was injected through the injection well at about 500 psi and 470° F. to heat the sand surrounding the communication zone. This initiated a production stream of water and bitumen flowing from the open production well. Once live steam was detected in the production steam, a production valve controlling the production flow rate from the well was closed a sufficient amount to reduce the production stream to a condensate flow. Injection of steam was continued for about 20 minutes, heating the communication zone and thereby establishing hot communication between the two wells.

Thermocouples, extending into the bed of sands to varying depths, provided data for temperature profiles at given depths.

The laboratory cell prepared in the above described manner was then ready for the injection of suitable additives into the steam injection stream in accordance with the process of the present invention.

The following examples serve to illustrate the process of the present invention, and were performed after hot communication was established as previously disclosed.

EXAMPLE 1

In a number of runs, an injection stream comprising the saturated steam-additive mixtures as set forth in Table I was introduced into the injection well for about 10 minutes, the injection steam being controlled at a pressure of about 500 psig and a temperature of about 470° F.

TABLE I

| Injection Stream Components | Concentration in Injection Stream |
|---|---|
| Steam alone | |
| steam / $CO_2$ | 0.35 SCF $CO_2$/lb. steam |
| steam / naphtha | 5.5 volume % naphtha/lb. steam |
| steam / $CO_2$ / naphtha | 0.12 SCF $CO_2$/lb. steam / 4 volume % naphtha/lb. steam |

A flow of formation fluids, where fluids include steam, steam condensate, hydrocarbon diluent, gas and bitumen, was established within the formation as the injection stream combined with and mobilized the formation bitumen. The flow was produced from the production well as injection recovery.

After injecting for a period of 10 minutes, the injection was terminated, the injection valve was closed and the production valve was fully opened. The production stream resulting from the pressure decrease during this drawdown cycle was the production recovery. The drawdown or drain period usually continued for about 20 minutes. An injection period followed by a pressure drawdown period, termed a cycle, was repeated as many as 60 times each run.

Figure 1:
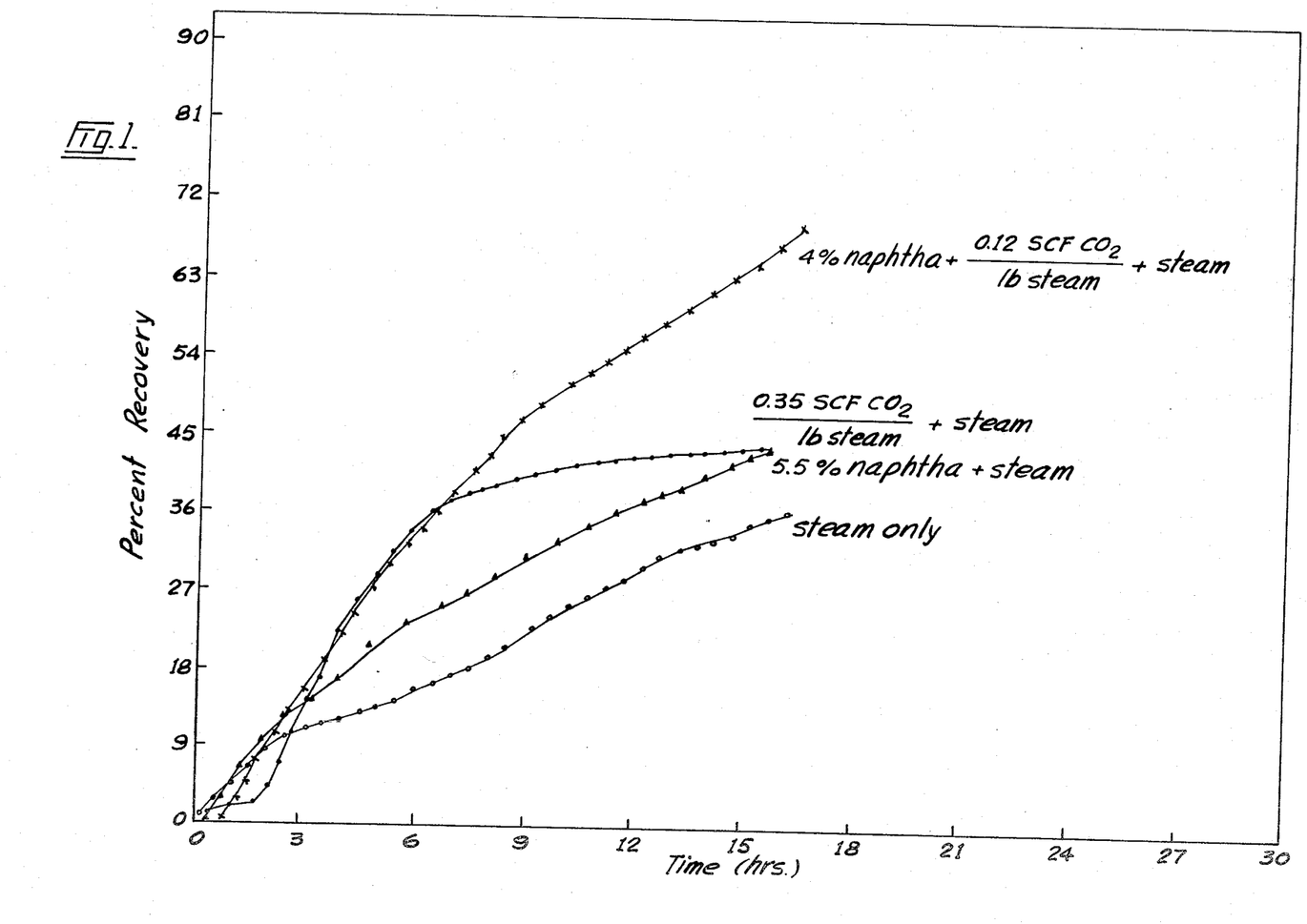
FIG. 1 is a graph showing percent total recovery as a function of time for different injection stream components.
Figure 2:
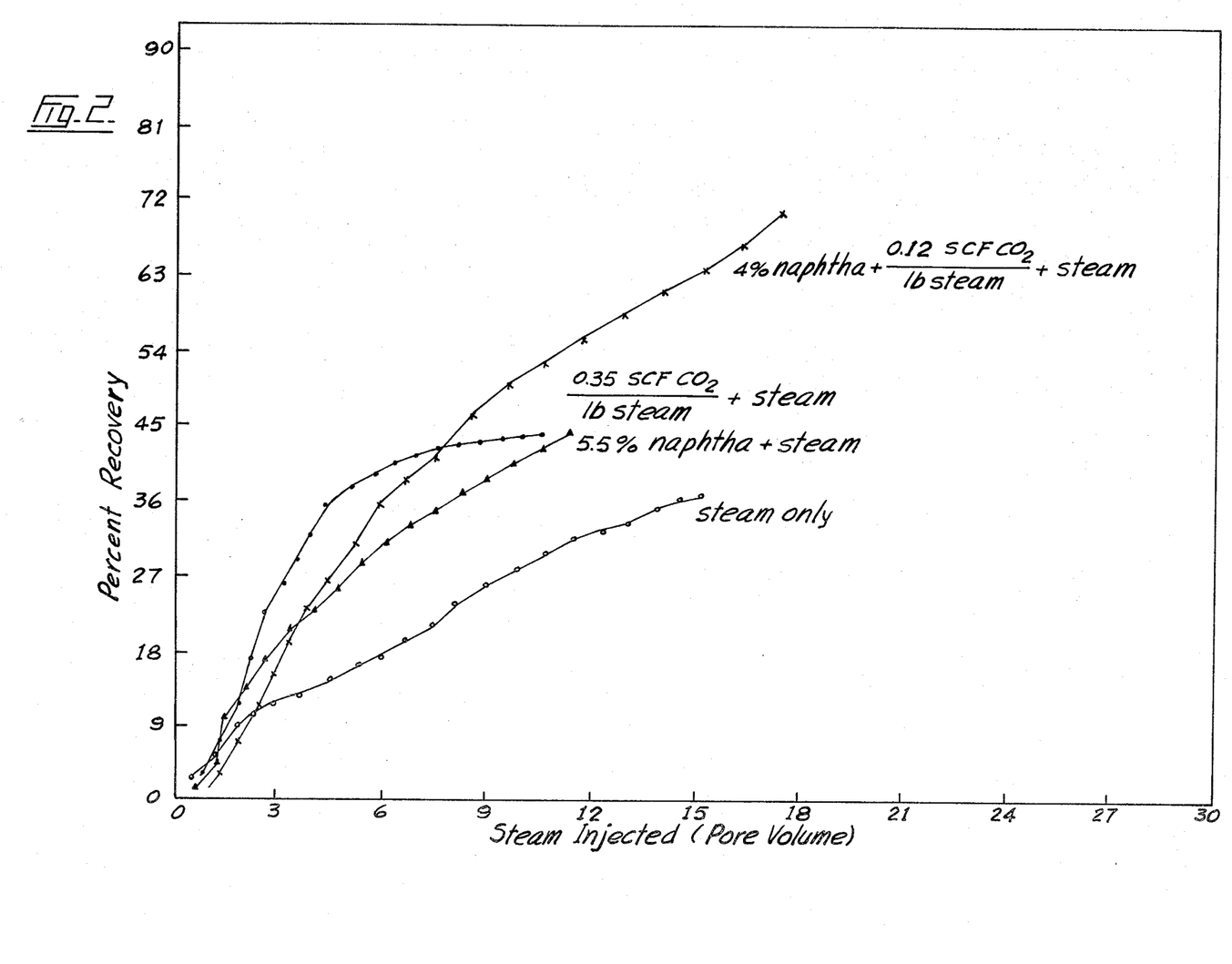
FIG. 2 is a graph showing percent total recovery as a function of pore volume steam injected for different injection stream components.

FIGS. 1 and 2 show total recovery, that is the combination of the injection and production recoveries, as functions of time and pore volume of steam injected. A pore volume of steam is that volume of steam if it were water that would occupy the pore space of the test bed, when pore space is that volume of the bed not occupied by the mineral matrix. Representing recovery as a function of pore volume steam injected takes into account the amount of recovery attributable to a large volume of steam injected. Often a recovery vs. time plot could show a steep slope indicating high recovery values whereas the corresponding recovery vs. pore volume stream injected plot for the same run could show a lower rise in recovery to indicate that portion of the recovery attributable to being able to inject a large quantity of steam. FIGS. 1 and 2 however, appear to show substantially the same trends in recovery.

Figure 3:
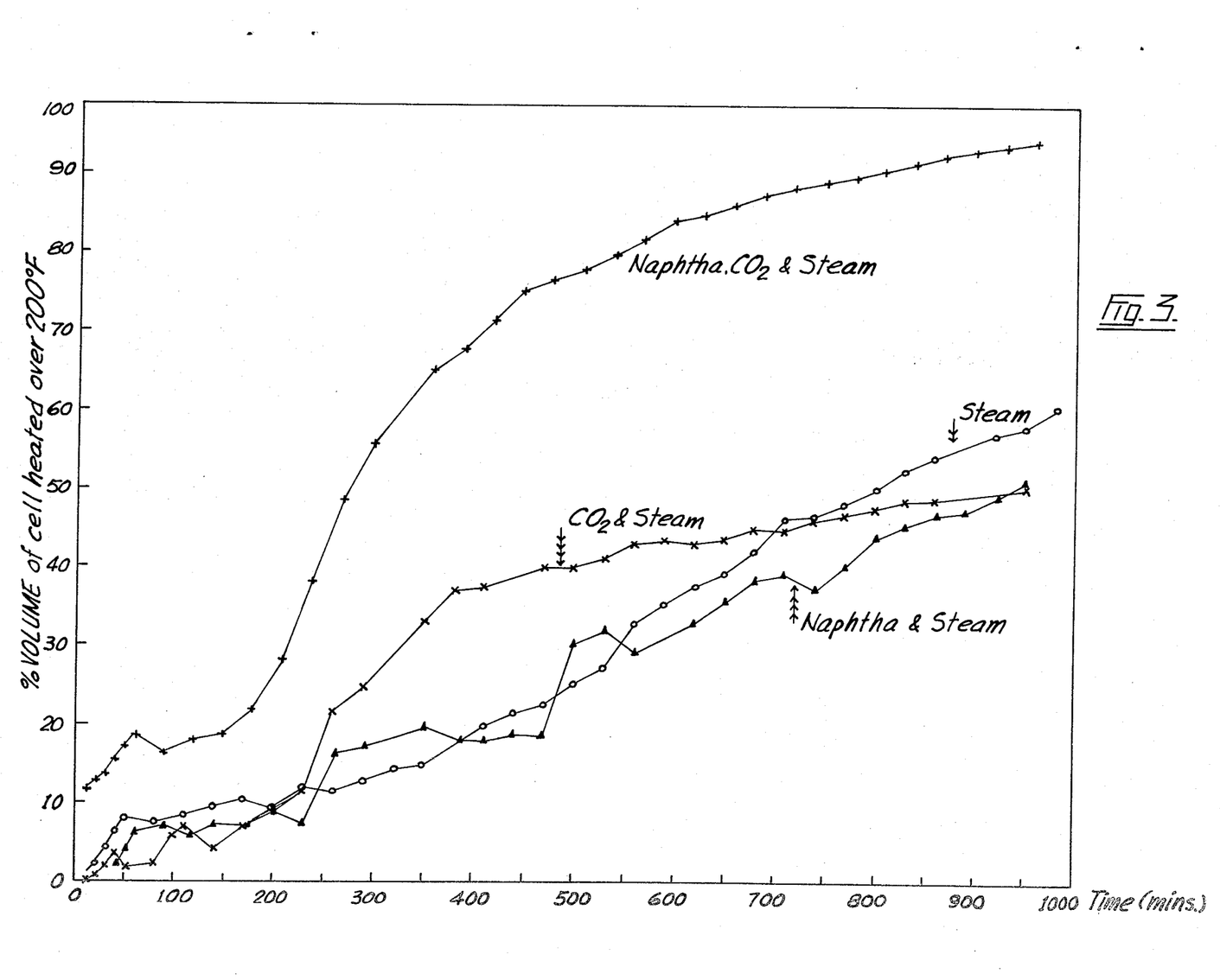
FIG. 3 is a graph illustrating the effect on the volume of the experimental cell heated over 200° F. with different injection stream components.

Temperature data obtained from the thermocouples penetrating the formation was accumulated every 10 minutes and computer processed to illustrate the volume of the bed of sands which was heated to a given temperature as a function of time. FIG. 3 depicts percent volume of the bed above 200° F. with time, such data being indicative of the extent of heat transfer from the steam within the formation.

In the run wherein steam, $CO_2$ and naphtha were injected simultaneously into the formation, the recovery curves indicate the benefits to the recovery from both the gas drive and solvent effect of the additives leading to a higher ultimate recovery than was obtained in the runs without the dual additives.

A typical gas-steam run, illustrated with the $CO_2$-steam run in FIGS. 1 and 2, was characterized by a high early recovery followed by a steep levelling off in the recovery after about 8 hours. A typical steam-solvent run, illustrated by the steam-naphtha run, was characterized by a low early recovery with recovery increasing almost linearly with time which would give a high ultimate recovery if sufficient time was provided.

The combination of the $CO_2$ and naphtha with the steam is able to strike a balance between these two extremes, receiving the benefits of early recovery from the use of $CO_2$ together with late recovery from the use of naphtha. The $CO_2$ and naphtha do not appear to function independently of each other, their two displacement mechanisms interacting to enhance the ultimate recovery.

In FIG. 3 it can be seen that the inclusion of both naphtha and $CO_2$ in the stream injection stream greatly enhanced the extent of heat transferred into the cell, thereby increasing the volume of steam entering the system and the conformance within the cell.

EXAMPLE 2

To demonstrate the effect of changing the concentration of the gas in the process of the present invention, the method as set forth in Example 1 was followed, injecting steam at a temperature of 470° F. and a pressure of 500 psig, and maintaining the concentration of naphtha at about 4 volume %/lb. steam injected. The concentrations of $CO_2$ were varied as 0.02, 0.05, 0.1, 0.2 and 0.5 SCF/lb. steam injected.

Figure 4:
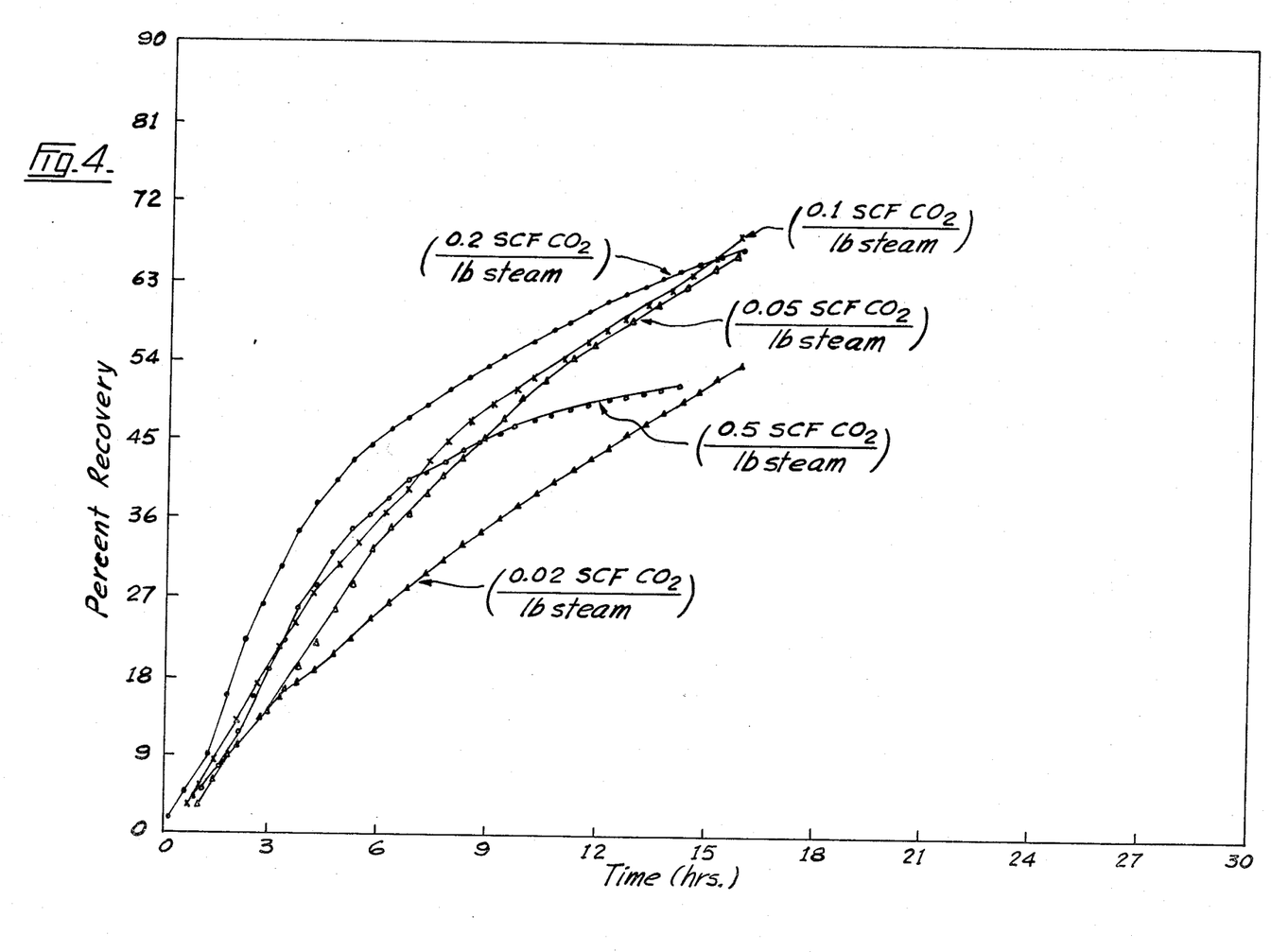
FIG. 4 is a graph illustrating the effect on a recovery vs. time plot of changing the concentration of carbon dioxide injected.
Figure 5:
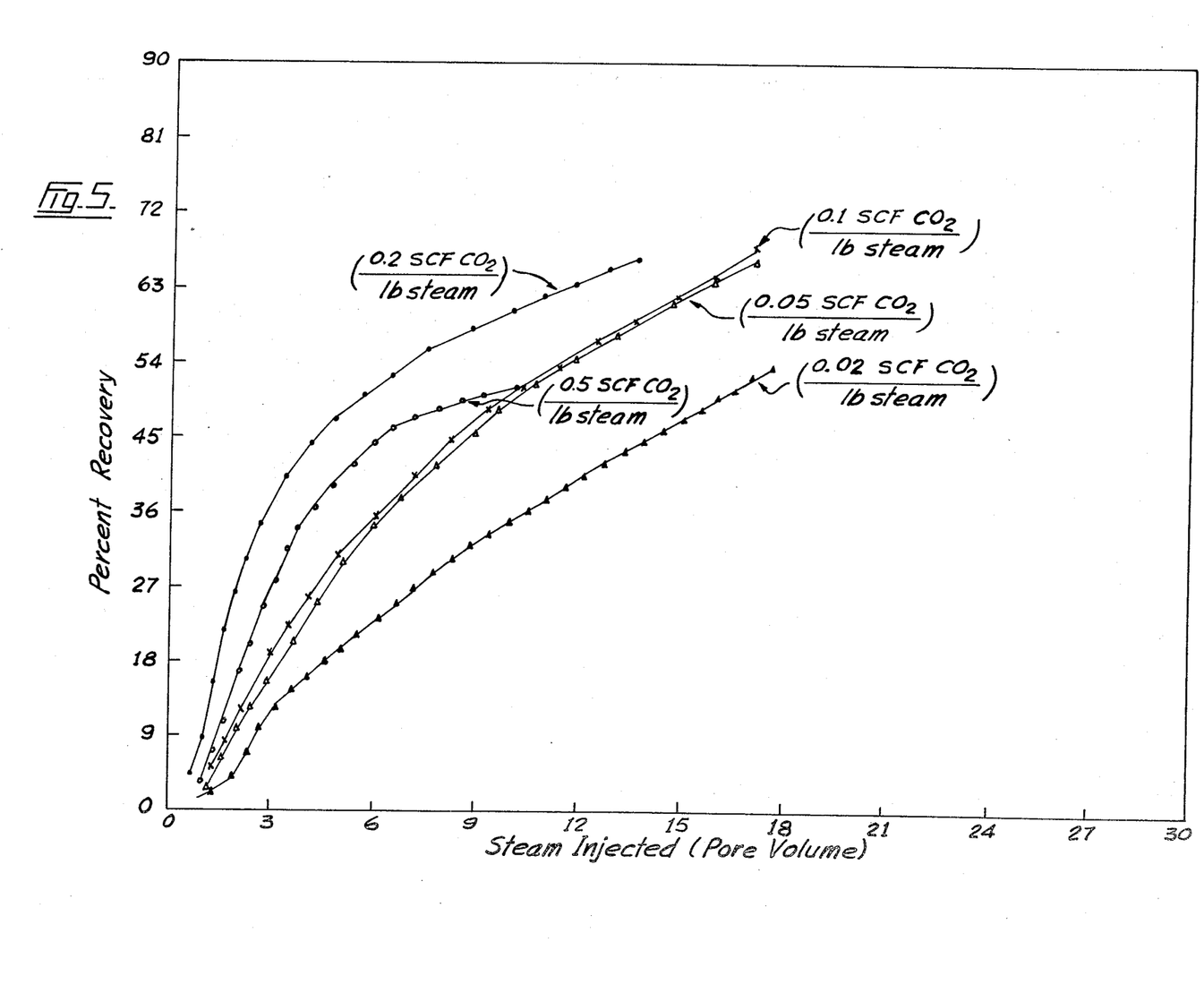
FIG. 5 is a graph illustrating the effect on a recovery vs. pore volume steam injected plot of changing the concentration of carbon dioxide injected.

Percent recovery of hydrocarbons from the bituminous formation as functions of time and pore volume steam injected for each run is shown in FIGS. 4 and 5.

At a $CO_2$ concentration of 0.5 SCF/lb. steam no significant changes were detected in the recovery curve from that of the typical steam—$CO_2$ run shown in FIGS. 1 and 2. Thus the effect of simultaneous injection of naphtha, $CO_2$ and steam at this concentration seems to be about the same as $CO_2$—steam alone.

By dropping the concentration of $CO_2$ to 0.2 SCF/lb. steam, the recovery curve tended to shift upwardly and the levelling off in the latter part of the experiment was not as pronounced. Further decreasing the concentration of gas to 0.1 SFC/lb. steam resulted in a reduction in the $CO_2$ effect of the sharp rise of early recovery while a higher later recovery due to the naphtha effect was observed.

Reducing the concentration of $CO_2$ to 0.05 or 0.02 SCF/lb. steam shifted the recovery curve toward the typical steam-naphtha curve of FIG. 1 with low early recovery and a near linear rise in the recovery curve.

It is also noted in referring to FIG. 5, that at the higher pore volumes of steam injected, the maximum recovery for a given $CO_2$ concentration shifted to the lower values of $CO_2$. This was a result of the high early recovery which occurred with the higher concentrations of $CO_2$. At the lower concentrations the $CO_2$ effect of high early recovery was reduced, late recovery from the solvent effect was increased and a higher ultimate recovery was achieved.

Figure 6:
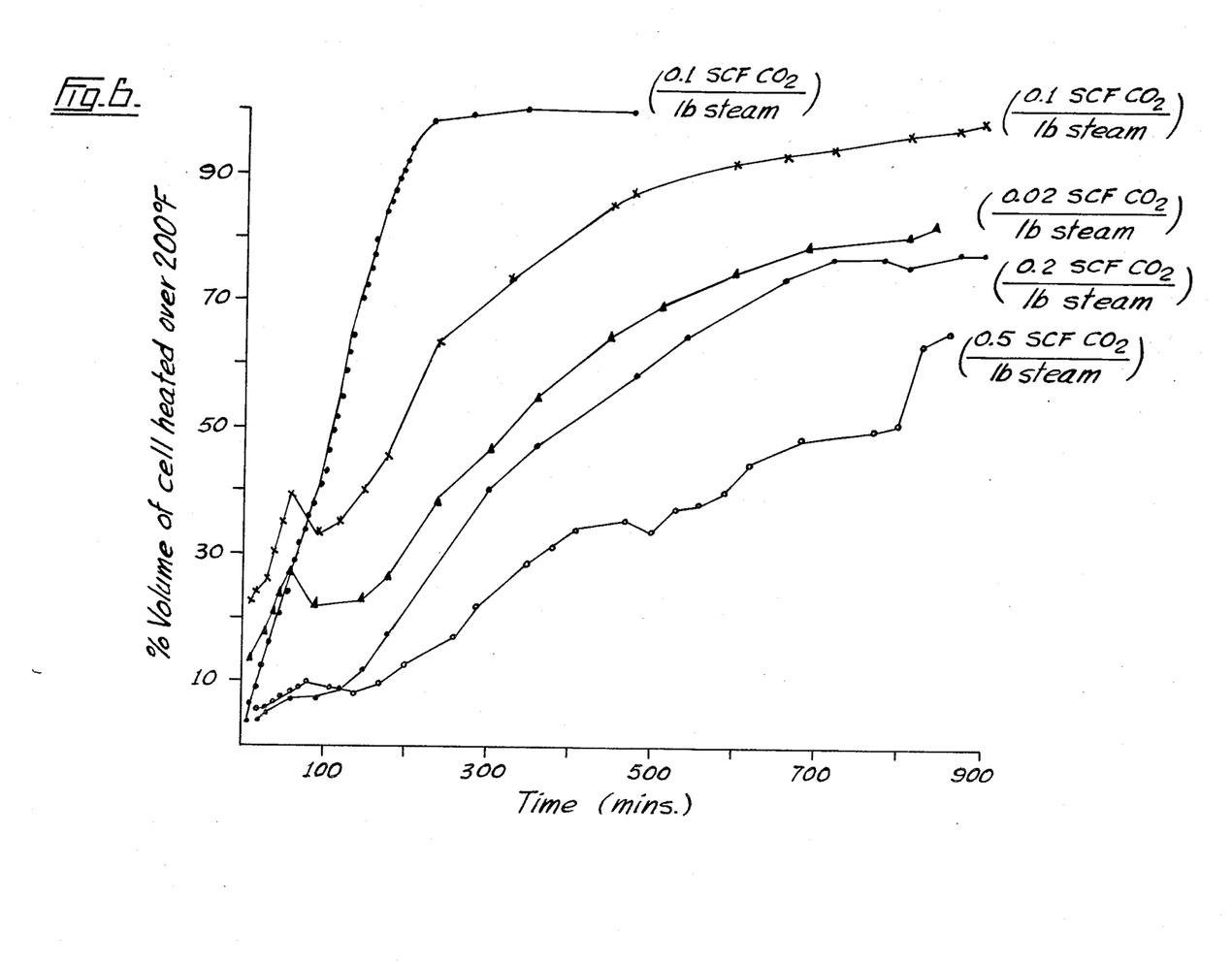
FIG. 6 is a graph showing the volume of the experimental cell heated above 200° F. as a function of time with changing concentrations of carbon dioxide injected.

Temperatures measured at different depths within the test bed with the use of the thermocouples were computer processed to give the volume of the bed heated above 200° F. as a function of time as depicted in FIG. 6. The graph indicates that as the concentration of $CO_2$ increased from 0.02 to 0.1 SCF/lb. steam, the heated volume of the cell continued to increase. Increasing the concentration of $CO_2$ to 0.5 SCF/lb. steam caused a dramatic decrease in the heated volume. This supports the hypothesis that, in a $CO_2$-naphtha-steam system, the $CO_2$ has a marked effect on the amount of steam which can enter the reservoir. In providing a driving energy to the formation fluids in the drawdown period, more of the heated or partially heated fluid is produced from the formation than would be without the $CO_2$. This creates an increasingly large void space to be heated by the steam on each subsequent cycle, expanding the steam zone volume. It appears that increasing the concentration of $CO_2$ in excess of that amount which will dissolve in the formation fluids results in a blanket of $CO_2$ gas at the interface of the heated and cold bitumen, which hinders further heat transfer from the steam to the cold bitumen.

Additional insight into the function of the gas in the process of the invention is obtained in comparing the production streams on injection and pressure drawdown cycles.

The production streams arising from producing the formation fluids were present in both liquid and gaseous states. The gaseous portion was present as the hotter fluids flashed through the production valve as a result of the pressure differential across the valve. The liquid portion was comprised of the cooler fluids being produced. The liquid and gaseous portions were separated in a cyclone separator into a liquid production stream A, and a gaseous production stream B. The latter stream was condensed through a series of condensors.

Figure 7:
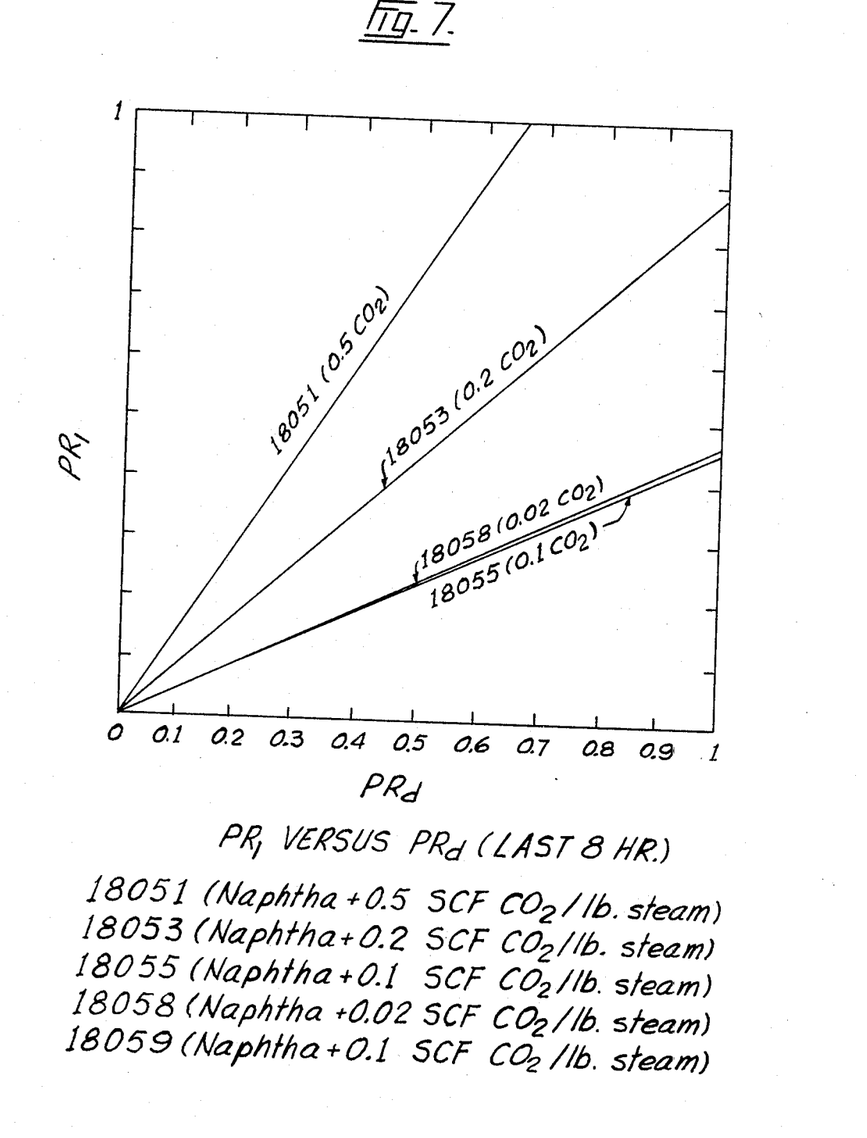
FIG. 7 is a graph showing production ratios on the injection and pressure drawdown cycles changing with different concentrations of carbon dioxide injected.

A production ratio, PR, can be calculated by taking a ratio of production B fluids to production A+B fluids as follows:

$$\text{Production Ratio} = \frac{\text{Weight of production B fluids}}{\text{Total weight of production A + B fluids.}}$$

The production ratios obtained on injection periods, PRi, are compared to the production ratios obtained on pressure drawdown periods, PRd, for each run with varying concentrations of $CO_2$. To arrive at the graphical comparison illustrated in FIG. 7, PRi was plotted against PRd for each of cycle of a run, and a best straight line constructed through the points using a PRi=O, PRd=O origin point.

The slope of the best fit line is seen to increase with increasing concentrations of $CO_2$. Thus at any given value of PRi, the corresponding PRd is decreasing concentrations of $CO_2$. This decrease in PRd is indicative of a higher ratio of cooler fluids, that is production A, being produced in the pressure drawdown cycles with the inclusion of larger amounts of $CO_2$. Since $CO_2$ is primarily providing drive energy to the recovery, more liquids are produced on a pressure drawdown cycle than on a corresponding injection cycle.

The results obtained in comparing production ratios, could be misleading if taken at face value, and thus must be taken in context with the amount of heat which can be transferred into the cell and the ultimate recovery obtained to arrive at a preferred concentration of $CO_2$ to be included in the system.

EXAMPLE 3

It is known that oxygen and steam will react with bitumen at elevated temperatures to produce carbon dioxide and carbon monoxide. This oxygen-bitumen reaction was investigated as a means to generating $CO_2$ in the formation for use with the process of the present invention.

Using an injection stream of saturated steam, 0.1 SCF $O_2$/lb. steam and 4 volume % naphtha/lg. steam, the process of example 1 was repeated. Some problems existed with blockage of the communications zone so a long steam-naphtha injection period was used to create a better communication zone followed by a long steam-naphtha-$O_2$ injection period before commencing a pressure drawdown period.

In testing the gas being produced with the formation fluids, it was determined that there had been about a 60% oxygen conversion to $CO_2$ and CO in a residence period of about 10 minutes.

Figure 8:
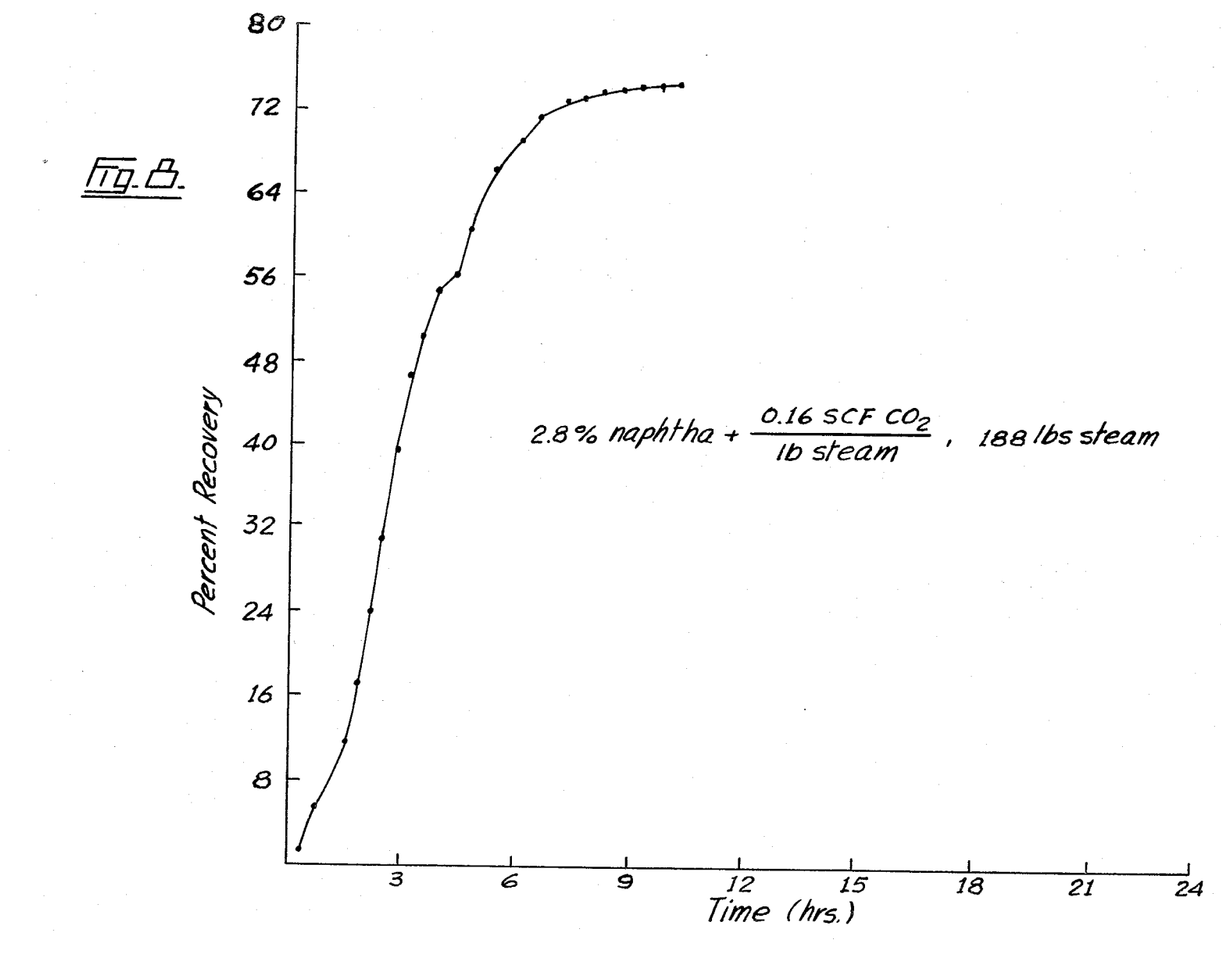
FIG. 8 is graph showing percent recovery as a function of time when oxygen is the gas in the injection stream.
Figure 9:
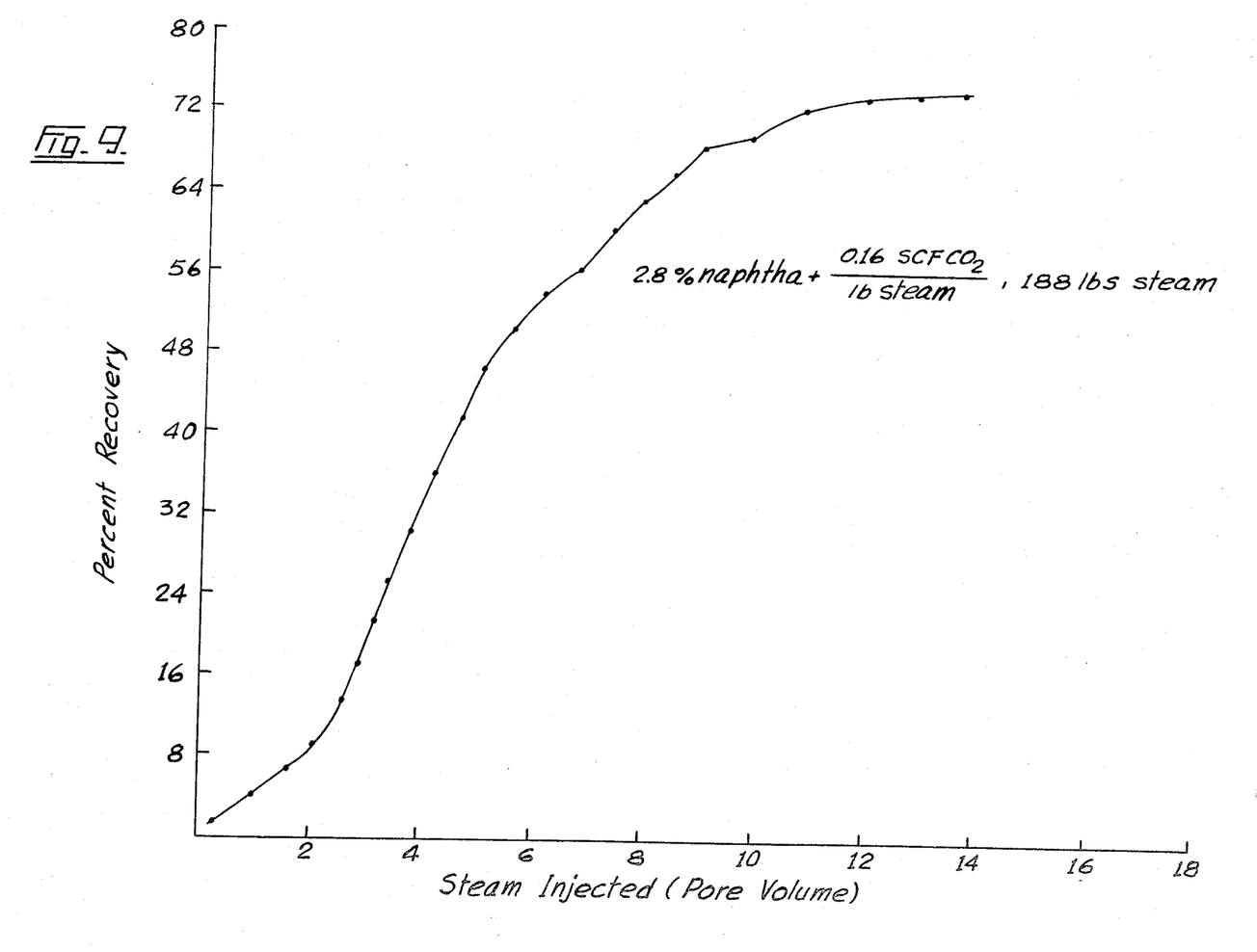
FIG. 9 is a graph showing percent recovery as a function of pore volume steam injected when oxygen is the gas in the injection stream.

Recovery curves, on a time basis shown in FIG. 8, illustrate a rapid depletion of the formation fluids from the cell. A very rapid initial rise in recovery is evident, typical of the $CO_2$-steam run shown in FIG. 1. Ultimate recovery, however, was high, approaching that of a typical steam-naphtha recovery after very long recovery periods.

The volume of the formation which was heated above 200° F. is shown in FIG. 6 as a function of time. Although not directly comparable to the naphtha-$CO_2$-steam runs due to different operating conditions, it is seen that the addition of $O_2$ increases the extent of steam penetration into the system as did the direct injection of $CO_2$.

Figure 10:
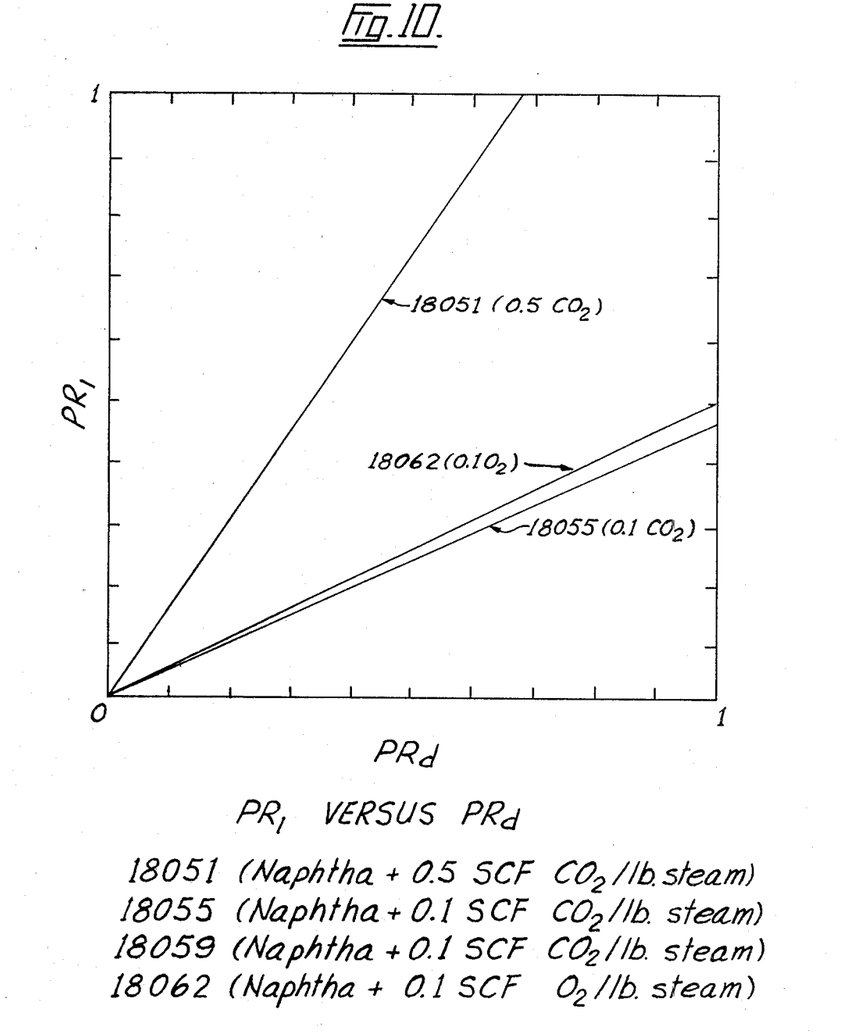
FIG. 10 is a graph illustrating production ratios on injection and pressure drawdown cycles when oxygen is the gas in the injection stream.

Comparison of production ratios for the naphtha-$O_2$-steam run with a naphtha-$CO_2$-steam run in which similar concentrations of $CO_2$ and naphtha were used, is shown in FIG. 10. The similarity in slope for the two runs indicate that the recovery mechanism explained previously is operating.

The Process

The process of the present invention disclosed can be extrapolated to operate under field conditions wherein injection and production wells penetrate a subterranean heavy oil containing formation are in hot communication with each other through an interconnecting permeable communication zone whether the zone be naturally occurring or mechanically fractured.

The steam, gas and hydrocarbon diluent are injected at conditions to initiate a flow of formation fluids which may be produced at the production well during an injection period and a pressure drawdown period. It may be desirable to close in both production and injection wells for a soak period following injection to allow the heat to permeate the formation fluids to drain into the communication zone, prior to opening the production well to produce mobile fluids.

Operable temperature and pressure conditions depend on such factors as the viscosity and thermal conductivity of the bitumen, the reservoir energy, the depth of the formation and the overall geology of the formation. These factors being variable between formations necessitate establishing operation conditions at each such formation. The temperature and pressure of injection should be greater than the formation temperature and pressure to allow the gas to dissolve in the formation fluids on the injection cycle.

While the process is preferably applied in a situation wherein at least two wells penetrate the formation, the process can also be applied to a single well situation. Here a permeable hot communication zone is pre-established exterior the well. The injection stream comprising saturated steam, hydrocarbon diluent and gas are injected into the formation, creating a steam chest. Once injection is ceased, the backflow of heated formation fluids flows into the well and production is established.

Injection and pressure drawdown cycles are repeatedly cycled.

The Gas

The gas additive used in the process of the present invention functions by providing drive energy within the reservoir to assist in recovery. Gases suitable for this process dissolve in the formation bitumen at injection pressure and come out of solution when the pressure is reduced during a drawdown period, thereby providing gas drive energy to the formation fluids. Carbon dioxide has been found to work in this manner. Oxygen, at the temperatures and pressures used in the present invention, reacts with bitumen to form carbon dioxide in-situ which is then soluable in the formation fluids. Ethane has been found in the past to be a suitable gas for providing drive energy to recovery, being highly soluable in the formation fluids. Due to the high cost involved however, ethane may not be an economically feasible gas. Carbon dioxide is a preferred gas because in addition to its high solubility in the bitumen, it is a relatively inexpensive gas.

The quantity of gas included in the injection stream will usually be that quantity from which the maximum drive energy can be derived, without casing a substantial decrease in fluid production. Fluid production decreases with excessive amounts of gas injected since the excess gas is believed to accummulate in a gas phase along the interface between the heated region of bitumen and the cold bitumen forming a hindering blanket to heat transfer from the steam to the bitumen.

While experimental data provide support for a preferred concentration range of $CO_2$ of about 0.02 to 0.2 SCF/lb. steam injected with injection temperature of 470° F. and pressure of 500 psig, this range may change as injection pressure is varied with the actual reservoir conditions.

Gases which exhibit a solubility in bitumen lower than that of $CO_2$ may present problems since, before a sufficient quantity of gas is injected to provide a sufficient drive energy, a quantity of the undissolved gas begins to form a gas-phase in the formation which can result in an undesired blanketing effect, hindering heat transfer from steam to the cold bitumen.

The Hydrocarbon Diluent

The hydrocarbon diluent is used to lower the viscosity of the bitumen and thus increase the mobility of the formation bitumen. At the temperature and pressure conditions of injection the diluent should dissolve in the bitumen without any substantial conversion to a gas. Naphtha, being a hydrocarbon fraction obtained in the refining of bitumen and which usually has a boiling point range of 150° to 450° F., is suitable for this purpose.

One major advantage of the present process is the amount of diluent necessary to improve recovery has been drastically reduced. The costs involved in including a refined oil product in the recovery of crude bitumen are very high. While prior patents suggest adding 10-40 volume % solvent/lb. steam, the process of the present invention can achieve a desirable level of recovery with less than 5% by weight of naphtha in the injection stream.

The embodiments of the invention in which an exclusive property or privilege is claimed are defined as follows:

1. In a recovery process wherein hot fluid is injected into a heavy oil reservoir through a well and formation fluids, including reservoir and injected fluids, are produced either through an adjacent production well or by backflowing the injection well, the improvement comprising:
injecting into the reservoir, at temperature and pressure greater than the formation temperature and pressure, an injection stream consisting essentially of steam, hydrocarbon diluent, and a gas, said diluent being chosen and provided in amount so as to dissolve in the heavy oil at formation temperature without vaporizing, said gas being gaseous at formation temperature and pressure and soluble in the formation fluids at the injection pressure;
terminating pressurized injection; and then
producing by pressure drawdown a stream of reservoir and injected fluids.

2. The improvement as set forth in claim 1 wherein: the steps are repeated at least once.

3. The improvement as set forth in claim 2 wherein: the hydrocarbon diluent is naphtha; and
the gas is selected from the group consisting of oxygen and carbon dioxide.

4. The improvement as set forth in claim 3 wherein: the naphtha is provided in the injection stream in a concentration of less than 5 volume percent/lb. steam; and
the gas is provided in the injection stream in a concentration range of about 0.02 to 0.2 SCF/lb. steam.

5. The improvement as set forth in claim 4 wherein: the gas is carbon dioxide.

6. In a process for the recovery of hydrocarbons from a reservoir of bituminous sands penetrated by an injection well and a production well which are interconnected by a permeable hot communication zone through the reservoir, the improvement comprising:
(a) injecting into the reservoir, through the injection well and hot communication zone, an injection stream at temperature and pressure greater than the formation temperature and pressure to mobilize the bitumen to produce a flow of formation fluids, said injection stream consisting essentially of steam, hydrocarbon diluent, and a gas which is gaseous at formation temperature and pressure and soluble in the formation fluids at injection pressure, the gas being included in the injection stream only in an amount which will be substantially dissolved in the formation fluids at the injection pressure and temperature the diluent being chosen and provided in amount so as to dissolve in the bitumen at formation temperature without vaporizing;

(b) terminating pressurized injection; and then
(c) producing the formation fluids by pressure drawdown from the production well.

7. The improvement as set forth in claim 6 comprising:
closing the injection well after a period of injection to soak the reservoir before subsequently opening the production well and producing formation fluids.

8. The improvement as set forth in claim 7 wherein the series of steps is repeated at least once.

9. The improvement as set forth in claim 8 wherein the hydrocarbon diluent is naphtha.

10. The improvement as set forth in claim 9 wherein naphtha is included in the injection stream in a concentration of less than 5 volume %/lb. steam.

11. The improvement as set forth in claim 10 wherein the gas is selected from the group consisting of carbon dioxide and oxygen.

12. The improvement as set forth in claim 11 wherein the gas is included in the injection stream in a concentration range of about 0.02 to 0.2 SCF/lb. steam injected.

13. The improvement as set forth in claim 8 wherein the gas is selected from the group consisting of carbon dioxide and oxygen.

14. The improvement as set forth in claim 13 wherein the gas is included in the injection stream in a concentration range of about 0.02 to 0.2 SCF/lb. steam injected.

* * * * *